United States Patent
Takenaka

(10) Patent No.: US 7,033,296 B2
(45) Date of Patent: Apr. 25, 2006

(54) DRIVE UNIT EQUIPPED WITH ELECTRICAL MOTOR

(75) Inventor: Masayuki Takenaka, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/476,644

(22) PCT Filed: Dec. 26, 2002

(86) PCT No.: PCT/JP02/13586

§ 371 (c)(1),
(2), (4) Date: Nov. 4, 2003

(87) PCT Pub. No.: WO03/055710

PCT Pub. Date: Jul. 10, 2003

(65) Prior Publication Data

US 2004/0121870 A1    Jun. 24, 2004

(30) Foreign Application Priority Data

Dec. 27, 2001    (JP) ............................. 2001-398634

(51) Int. Cl.
*B60K 17/04* (2006.01)

(52) U.S. Cl. ........................................................ 475/5

(58) Field of Classification Search ................. 475/1, 475/5
See application file for complete search history.

(56) References Cited

U.S. PATENT DOCUMENTS

| | | | | |
|---|---|---|---|---|
| 5,799,744 A | * | 9/1998 | Yamaguchi et al. | 475/5 |
| 6,166,498 A | * | 12/2000 | Yamaguchi et al. | 318/34 |
| 6,553,868 B1 | * | 4/2003 | Takenaka et al. | 74/665 B |
| 6,575,865 B1 | * | 6/2003 | Takenaka et al. | 475/5 |
| 6,692,394 B1 | * | 2/2004 | Takenaka | 475/5 |
| 6,695,736 B1 | * | 2/2004 | Takenaka | 475/5 |
| 6,715,291 B1 | * | 4/2004 | Liao | 475/5 |
| 6,822,353 B1 | * | 11/2004 | Koga et al. | 310/64 |
| 2001/0050190 A1 | | 12/2001 | Takenaka | |

FOREIGN PATENT DOCUMENTS

| | | |
|---|---|---|
| JP | 57-107021 | 7/1982 |
| JP | 59-11943 | 1/1984 |
| JP | 63-128536 | 8/1988 |
| JP | 2-48649 | 2/1990 |
| JP | 2001-187535 A | 7/2001 |
| JP | 2001-354042 A | 12/2001 |

* cited by examiner

*Primary Examiner*—Sherry Estremsky
(74) *Attorney, Agent, or Firm*—Oliff & Berridge PLC

(57) ABSTRACT

A drive unit equipped with an electric motor including an input shaft that is connected to an engine, an electric motor shaft, a counter output shaft, and a planetary gear set, wherein the input shaft and the counter output shaft are connected respectively, on one side of the planetary gear set, to two other elements which are different from an element with which the electric motor shaft is connected, an outer circumference of both edge portions of the counter output shaft is supported by a drive unit case, and an outer circumference of the input shaft is supported by an inner circumference of the counter output shaft by the drive unit case through the counter output shaft.

13 Claims, 4 Drawing Sheets

DRIVE UNIT EQUIPPED WITH ELECTRICAL MOTOR

BACKGROUND OF THE INVENTION

1. Field of the Invention

The invention relates to a drive unit for a vehicle equipped with an electric motor.

2. Description of Related Art

A drive unit for an electric vehicle or a hybrid drive unit has been adopted as a drive unit for a vehicle, in which an electric motor is used as a drive source. A similar drive unit has been disclosed in Japanese Patent Laid-Open No. 2001-187535, in which an engine, a generator, and a gear train, which is drive-connected to a wheel through a differential unit, are connected through a planetary gear set. Power can thus mutually transmit among the engine, the generator, and the wheel. Accordingly, the drive unit can freely execute driving of the generator by the engine, assist in the driving force and start the engine when the generator serves as the electric motor, and perform regeneration using an inertia power which is returned from the wheel to the planetary gear set through the differential unit.

In the aforementioned conventional art, the engine and the generator are aligned coaxially in a side-by-side manner with the planetary gear set coaxially interposed therebetween. Furthermore, the gear train has a dual shaft structure with an input shaft for connecting the engine with one element of the planetary gear set, and a counter output shaft for connecting the wheel with the other elements of the planetary gear set through the gear train and the differential unit. The input shaft and the output shaft are related in which the input shaft serves as an inner circumference and the output shaft serves as an outer circumference.

SUMMARY OF THE INVENTION

In the conventional art, however, a counter drive gear (21) for engine output (hereinafter, for the purpose of reference, the names or the reference numerals, otherwise both, of the members in the disclosed Japanese Patent Laid-Open No. 2001-187535 will be denoted with parentheses) is supported on one side by a pair of bearings (angular contact ball bearings 53, 53), on a case supporting wall (40a).

This kind of one-sided supporting structure does not cause problems in that the supporting wall has sufficient rigidity strength. However, when the driving unit is provided with a generator, a power supply cable having a large wire diameter for connecting the generator and a control unit has to be guided from the outside of the drive unit case into the inside thereof so as to be connected with a stator coil of the generator. This causes a problem. Particularly, as in the conventional art which has a structure in which an electric control unit (104) such as an inverter is integrated with the drive unit, an introduction portion of a cable (wiring 100c) should be provided at a place other than a control unit mounting portion. Furthermore, if the introduction portion is provided with space for a cable connection, it is unavoidable that the portion corresponds to an outside circumferential side of the planetary gear set (planetary gear 6) which has a small outer diameter. A large window hole is thus used for cable connection work that must be provided on the supporting wall of the counter drive gear (21). Accordingly, rigidity strength of the supporting wall is unavoidably decreased due to the formation of this window hole. In such circumstances, in the aforementioned one-side-supporting structure, an oscillated rotation of the counter drive gear still easily occurs, and thus gear noise occurs due to a meshing misalignment with the counter driven gear.

In addition, with regard to an input shaft (13) which is supported by a counter output shaft (a running rotation shaft 16), a coupling portion side thereof with respect to the planetary gear set is supported by the counter output shaft through a needle bearing (57). In this supporting structure, the input shaft is supported by the case supporting wall (40a) through the counter output shaft, a boss portion (21a) of the counter drive gear (21), and the ball bearings (53,53). In this supporting structure, the input shaft is influenced by the oscillated rotation of the counter drive gear (21). Furthermore, the needle bearing (57) is arranged in a misaligned axial direction with respect to a spline-engaging portion of the counter drive gear (21) and the counter output shaft. A slightly oscillated rotation of the counter drive gear (21) is thus amplified in a supporting portion of the input shaft (13) to the counter output shaft. This, combined with the aforementioned influence, results in more unstable supporting of the input shaft 13. This factor can thus cause a meshing misalignment among a sun gear, a pinion gear and a ring gear of the planetary gear set.

Hence, the invention thus provides a drive unit equipped with an electric motor, in which a counter output shaft is stably supported, the oscillated rotation of the counter drive gear is inhibited, and gear noise due to meshing misalignment with a counter driven gear can be prevented. Furthermore, the invention also prevents meshing misalignment of the planetary gear set which is arranged on the same shaft as the counter output shaft.

To achieve the foregoing as well as other advantages, the invention is provided with a drive unit equipped with an electric motor, including an input shaft that is connected to an engine, an electric motor shaft that serves as an output shaft of an electric motor, a counter output shaft, and a planetary gear set for drive-connecting the input shaft, the electric motor shaft and the counter output shaft so as to enable mutual transmission of power in which the input shaft is arranged in a coaxial relationship in an inner circumference of the counter output shaft, wherein the input shaft and the counter output shaft are connected respectively, on one side of the planetary gear set, to two other elements which are different from an element with which the electric motor shaft is connected, an outer circumference of both edge portions of the counter output shaft is supported by a drive unit case, and an outer circumference of the input shaft is supported by an inner circumference of the counter output shaft by the drive unit case through the counter output shaft.

In this structure, the counter output shaft is supported at both end portions thereof by the drive unit case, and thus an inclination of the counter output shaft due to a torque-transmission load is inhibited. Accordingly, an oscillated rotation of the counter output shaft is prevented, thereby gear misalignment due to the oscillated rotation is prevented, and gear noise occurrence is therefore prevented. Furthermore, the input shaft is supported by the drive unit case through the counter output shaft for which the oscillated rotation has been inhibited, and thus the oscillated rotation of the input shaft is also prevented. Therefore, misalignment of the planetary gear set connected thereto is also prevented.

BRIEF DESCRIPTION OF THE DRAWINGS

Various embodiments of the invention will be described with reference to the figures, wherein.

DETAILED DESCRIPTION OF PREFERRED EMBODIMENTS

Figure 2:
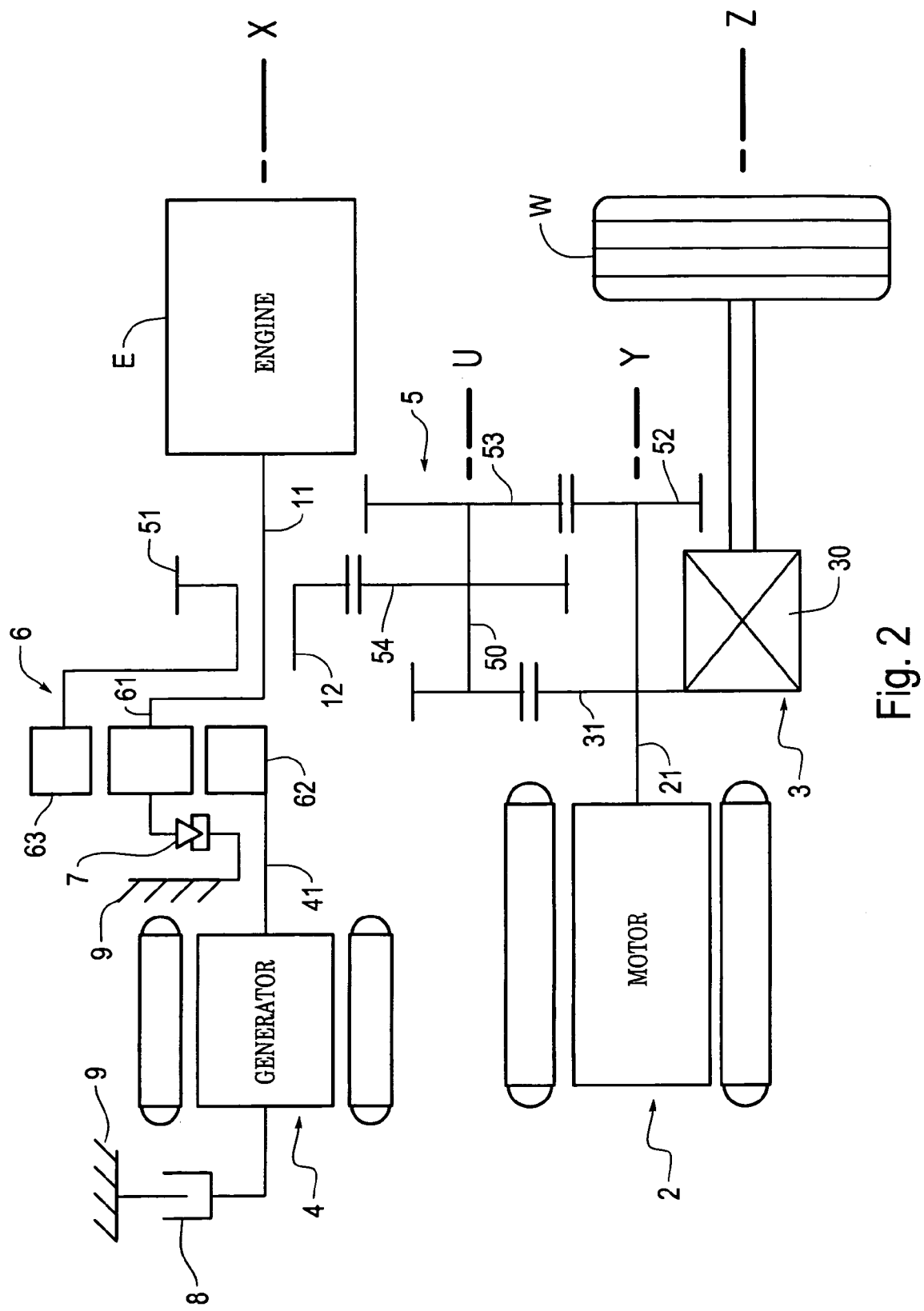
FIG. 2 is a skeleton view of a gear train of the hybrid drive unit.

An embodiment of the invention will be described with reference to the figures. First, FIG. 2 is a skeleton view schematically showing a hybrid drive unit in which the invention is adopted. In this figure, a gear train is developed on a same plane. This unit is provided as a drive unit of a transversely placement type, in which an engine E, an electric motor (motor) 2, and a differential unit 3 are arranged parallel on different axial lines respectively. Hereinafter, these axial lines are referred to as an engine axial line X, an electric motor axial line Y, and a differential axial line Z, in the description of the embodiment. Furthermore, a generator 4 is disposed on the engine axial line X, and a gear train 5 is disposed for drive-connecting the engine E, the motor 2, and the generator 4 to the differential unit 3 on parallel axes. A counter shaft 50 of the gear train 5 is arranged on another axial line (similarly, referred to as a counter axial line U) different from the respective axial lines mentioned above. Further, a planetary gear set 6 is arranged on the engine axial line X for drive-connecting the engine E, the generator 4, and a counter drive gear 51 of the gear train 5, in a differential relationship. In addition, a one-way clutch 7 is arranged on the engine axial line X for preventing a reverse rotation of the engine E for the purpose to be described later. Furthermore, a braking unit 8 for appropriately stopping a rotation of the generator 4 is arranged.

A specific drive-connecting relationship of the elements on the aforementioned respective axial lines in this drive unit are provided such that an input shaft 11 on the engine axial line X is connected at a rear edge thereof (hereinafter, a front-rear relationship of the respective shafts described assuming that the side on which the engine is placed is the front), to a carrier 61 of the planetary gear set 6; an electric motor shaft 41 which is provided with a rotor shaft of the generator 4 is connected at a front edge thereof to a sun gear 62 of the planetary gear set 6, and in addition, connected at a rear edge thereof to a drive unit case 9 through the braking unit 8; and a ring gear 63 of the planetary gear set 6 is connected to a rear edge of a counter output shaft 12 which is integrated with the counter drive gear 51 constituting an output member on the engine axial line X. An output element on the motor axial line Y is provided as a counter drive gear 52 which is connected to a front edge of a rotor shaft 21 of the motor 2. Both of these counter drive gears 51, 52 are meshed with counter driven gears 53, 54 arranged on the counter axial line U, thereby being drive-connected to the counter shaft 50. The counter shaft 50 is drive-connected to the differential unit 3 such that a differential drive pinion gear 55 which is arranged in a rear edge thereof on the axial line U is meshed with a differential ring gear 31 which is fixed to a differential case 30 of the differential unit 3. Further, the one-way clutch 7 is connected to a rear edge of the carrier 61 of the planetary gear set 6 and to the drive unit case 9, thereby being arranged between the planetary gear set 6 and the generator 4. Additionally, the braking unit 8 is connected to a rear edge of the rotor shaft 41 of the generator 4. Note that a reference alpha-numeral W in the figure shows a wheel which is drive-connected to a side gear (not shown) in the differential unit 3.

Figure 3:
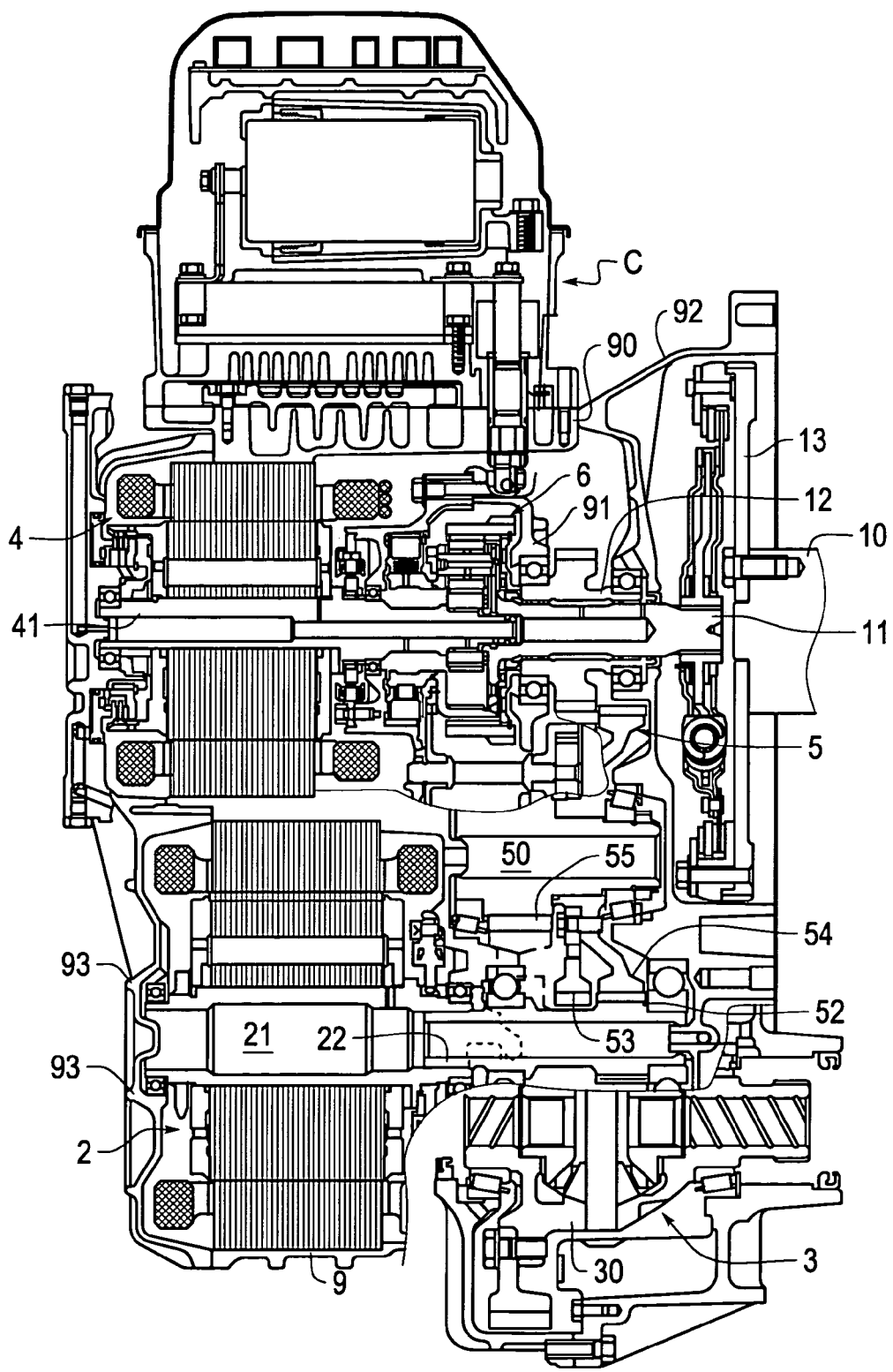
FIG. 3 is a developed cross-sectional view of the hybrid drive unit in the axial direction, developed along a gear train.
Figure 4:
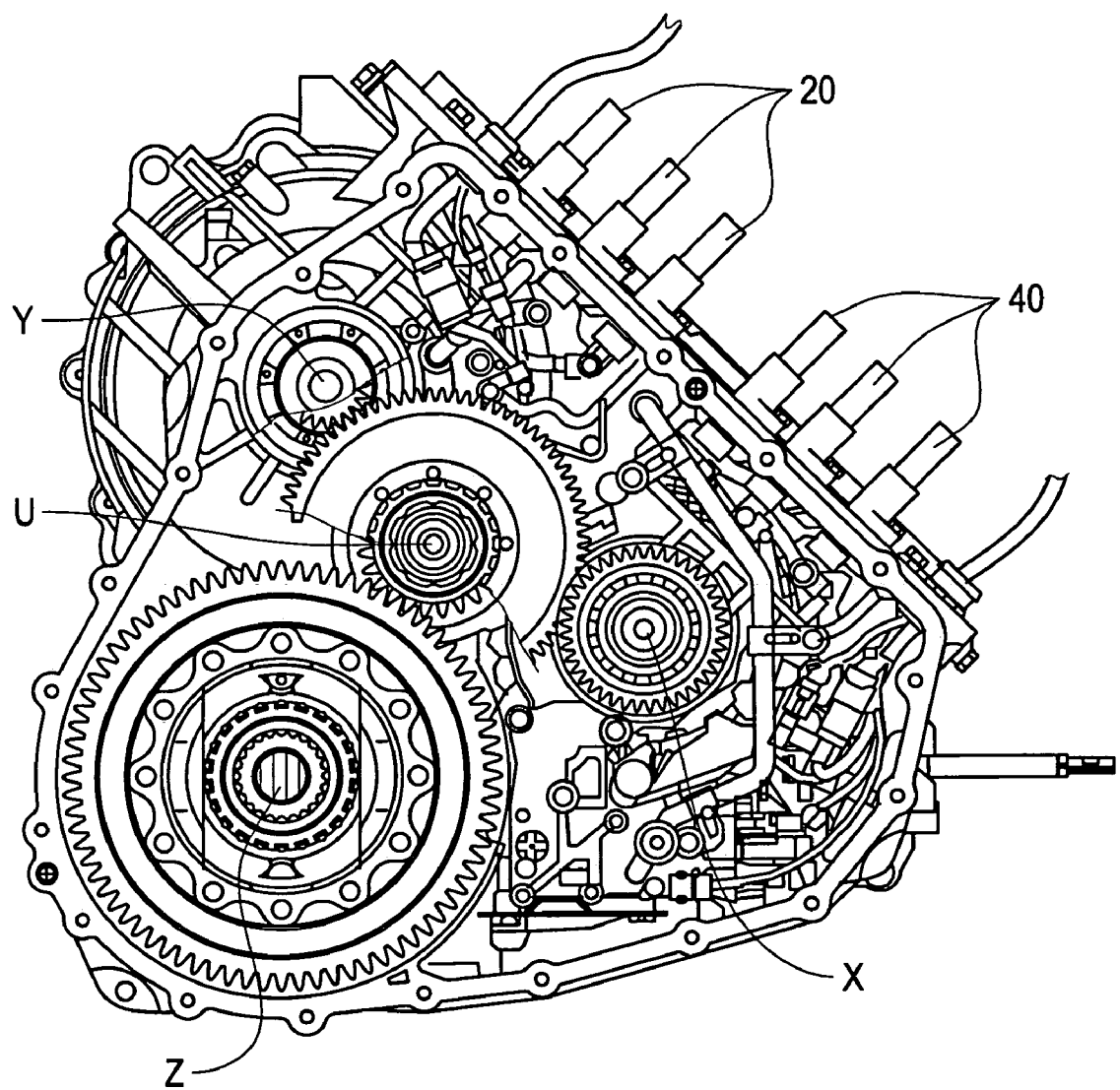
FIG. 4 is a side elevational view of the hybrid drive unit viewed from an engine connection side, in which a front cover of a case has been removed.

FIG. 3 is a developed sectional view in the axial direction and FIG. 4 is a side elevational view, respectively, showing the structure of the drive unit in detail. To describe the detail structure which cannot be shown in the foregoing FIG. 2, referring to FIG. 3, the motor 2 and the generator 4, the gear train 5, and the differential unit 3 are housed in the drive unit case 9. The drive unit case 9 has an intermediate wall 91 on a front side of the case body 90 thereof, and has openings in front and rear edges thereof. The drive unit case 9 is further provided with a front cover 92 which serves as a front wall for covering these openings, and with a rear cover 93 which serves as a rear wall. In addition, a space provided between the intermediate wall 91 of the case body 90 and the rear cover 93 serves as a housing portion for the motor 2, the generator 4, and the planetary gear set 6. A space provided between the intermediate wall 91 of the case body 90 and the front cover 92 serves as the housing portion for the gear train 5 and the differential unit 3.

The motor 2 is arranged in the motor housing space such that a stator of the motor 2 is provided so as that the stator does not rotate on a peripheral wall of the case body 90. The rotor shaft 21 is supported by the front and rear edges thereof respectively on the intermediate wall 91 and the rear cover 93 through a radial ball bearing. A gear shaft 22 is connected to the front edge of the rotor shaft 21 by spline-engagement. The front and rear edges of the gear shaft 22 are supported by the front cover 92 and by the intermediate wall 91 respectively through the radial ball bearing. Further, the counter drive gear 52 is integrally formed in this gear shaft 22.

The generator 4 is arranged in the generator housing space such that the stator thereof does not rotate on the peripheral wall of the case body 90. The rotor shaft 41 thereof is provided such that an intermediate portion thereof is supported by a wall of the housing portion for the planetary gear set 6, which is provided as an ancillary on the intermediate wall 91, and such that the rear edge thereof is supported by the rear cover 93, respectively through the radial ball bearings. The sun gear 62 of the planetary gear set 6 is connected by spline-engagement to a portion closer to a front edge of the rotor shaft 21. A tip portion of the rotor shaft 41 is fitted into a rear edge of the input shaft 11 in an oil-tight state.

The differential unit 3 is arranged in the housing portion therefore, with the front and rear edges of the differential case 30 being supported on the front cover 92 and the intermediate wall 91 respectively, through tapered roller bearings.

The counter shaft 50 of the gear train 5 is arranged in a respective housing portion, with the front and rear edges thereof being supported on the front cover 92 and the intermediate wall 91 respectively, through the tapered roller bearings. A differential drive pinion gear 55 is integrally formed on a rear half portion of the counter shaft 50. In a front half portion, the counter driven gear 54 is fitted by spline-engagement in order to prevent rotation. In addition, the counter driven gear 53 is fixed by a bolt on a rear side of the counter driven gear 54.

An actual positional relationship of each of the axial lines X, Y, Z, U is shown in FIG. 4. In this drive unit, the differential axial line Z is arranged on a lowest portion of the unit, and the engine axial line X is arranged in a diagonal upper portion therefrom (a front portion when being mounted in a vehicle). The motor axial line Y is arranged in an upper portion of the differential axial line Z. The counter axial line U is arranged in an intermediate portion of the aforementioned three axial lines X, Y, Z. In addition, the motor 2 and the generator 4, and furthermore, a control unit C including therein an inverter and an electronic control unit for controlling the braking unit 8 are externally mounted on the drive unit case 9. A mounting position thereof is such that a plane substantially in contact with the outer circumferences of the motor 2 and the generator 4 is provided as an alignment face of case frames of the drive unit case 9 and the control unit C. As mentioned above, since the engine axial line X and the motor axial line Y are different in height, this alignment face is inclined forward and downward toward a front portion (the right hand side in FIG. 4) of a vehicle in a state where the drive unit is mounted.

Electric power supply cables 20, 40 in groups of three are arranged side by side in a longitudinal direction of the control unit C, that is, in a front-rear direction thereof when the electric power supply cables 20, 40 are mounted on a vehicle. These cables are introduced into a gear train housing space in the drive unit case 9, from a plane alignment face of the drive unit case 9 and the control unit C. Then, each of the terminals are connected to a winding cable terminal which is guided out from a winding of the motor and the generator through a window hole in the intermediate wall. Therefore, a connection portion of these terminals is placed, in the axial direction, at a position between the motor 2 and the counter drive gear 52 thereof, in the gear train housing space, the position being the same as a position at which the planetary gear set is disposed.

Figure 1:
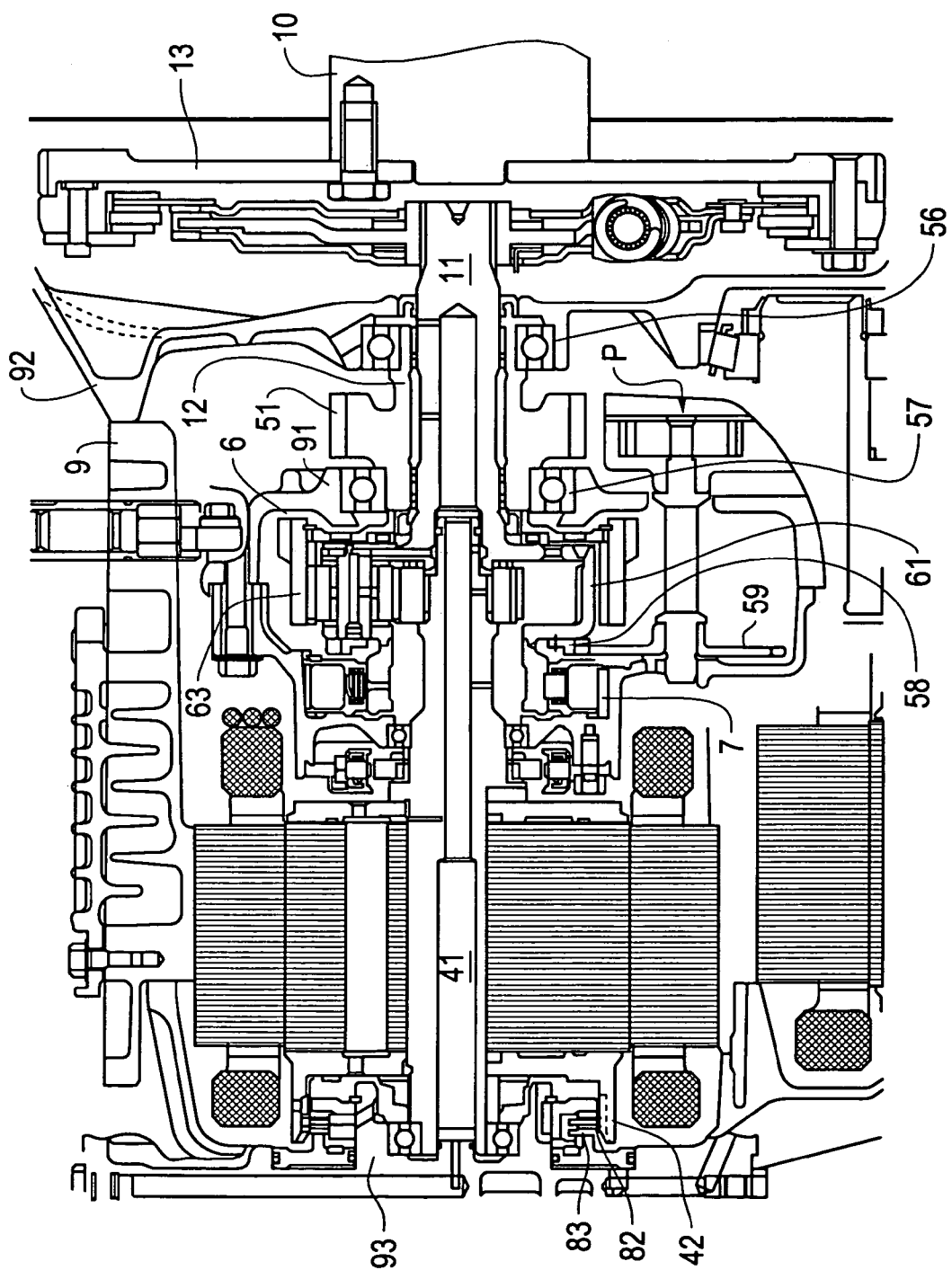
FIG. 1 is a partial sectional view of a hybrid drive unit in an axial direction, according to an embodiment of the invention.

As shown in detail in an enlarged view in FIG. 1, in accordance with a feature of the invention, the input shaft 11 and the counter output shaft 12 are respectively connected to the carrier 61 and the ring gear 63 which serve as two other elements different from an element to which the rotor shaft 41 as an electric motor shaft is connected, that is, the sun gear 62, is connected on the other side of the planetary gear set 6. The counter output shaft 12 has a counter drive gear 51 integrated therewith, and is provided such that the outer circumferences of both edge portions thereof (rigorously, the front edge and the rear edge excluding tips which serve as connection portions to the crank shaft 10 of the engine) are supported by the front cover 92 and the intermediate wall 91 of the drive unit case 9, through the radial ball bearings 56, 57. The input shaft 11 is supported by the drive unit case 9 through the counter output shaft 12 such that the outer circumference of the input shaft 11 is both-side-supported by the counter output shaft 12 through one pair of needle bearings on an inner circumferential side of the supporting portion to the drive unit case 9 of the counter output shaft 12. A tip of this input shaft 11 is connected to the crank shaft 10 of the engine through a unit 13 having a torque limitter, which serves as a flywheel and as a damper. As apparent from each connection relationship described above, the counter output shaft 12 is connected to the wheel W through the gear train 5 which is provided with the counter drive gear 51, the same driven gear 53, the counter shaft 50, the differential drive pinion gear 55, and the differential ring gear 31. The relationship is provided such that the motor 2 which serves as a second electric motor is connected to the counter shaft 50 in this gear train 5 through the counter drive gear 51 and the driven gear 54.

In the planetary gear set 6, the carrier 61 which serves as an element connected to the input shaft 11 is arranged in the rear side of the intermediate wall 91 such that the rear edge of the input shaft 11 is provided as a carrier flange, and furthermore, such that the carrier cover is drive-connected, on the other side of the planetary gear set 6, to an oil pump P of which a pump body is embedded in the intermediate wall. In further detail, the connection to the rotor shaft is provided such that a meshing with a ring-shaped spur gear 58, fixed to the carrier cover, is made. The connection by the ring-shaped spur gear 58 being made through a spur gear 59 fixed to the rotor shaft of the oil pump P. Furthermore, the front side of the ring gear 63 is connected by spline-engagement to the rear edge of the counter output shaft 12 through the ring gear flange.

The one-way clutch 7 is supported such that an inner lace thereof is connected to the carrier 61 of the planetary gear set 6, and that an outer lace is fitted by spline into a wall of the planetary gear set housing portion.

The braking unit 8 is structured such that the rotor 42 side of the generator 4 is provided as a drum, and that a boss portion protruding from the rear cover 93 of the drive unit case 9 serves as a hub. The braking unit 8 is also structured from a friction material disc 82 and a separator plate 83 which are provided as friction engagement members, and that an oil servo for engaging/disengaging the friction engaging members is assembled in the rear cover 93. The friction material disc 82 is provided such that an inner circumference of a circular flange portion overhanging from an edge plate of the rotor 42 in the axial direction is engaged by a spline with an outer circumference thereof. The separator plate 83 is provided such that an outer circumference of the hub is engaged by a spline with an inner circumference thereof.

In the drive unit having this structure, referring to FIG. 2, the motor 2 and the wheel W are related so as to be directly connected through the gear train 5 for power transmission, separately from a differential rotation by the differential unit 3. On the other hand, the engine E and the generator 4 are connected to the gear train 5 in a differential relationship through the planetary gear set 6 for power transmission. Accordingly, the engine E, the generator 4, and the motor 2 are appropriately controlled in order to drive the wheel shaft W with a motor output only, with an engine output only, or with the engine output assisted by the motor output. The vehicle is thus allowed to run using a battery recharged by the generator 4 driven by the engine E output in accordance with a remaining amount of a battery and with a running load.

During the driving operation control described above, the rotor shaft 41 of the generator 4 is latched with the drive unit case 9 as required. The braking unit 8 thus functions to prevent a driving loss generation by being rotated by a reaction torque when electric power generation is not required. Furthermore in this drive unit, the generator 4 is driven as the motor, and thus a reaction force applied to the carrier 61 of the planetary gear set 6 is reversely rotated. Accordingly, the reaction force element is provided through the one-way clutch 7, for engaging the carrier 61 with the drive unit case 9. Therefore, an output from the generator 4 can be transmitted to the ring gear 63, and the power can be increased (parallel mode running) when the vehicle is started by a co-output of the motor 2 and the generator 4.

As described above in detail, in the drive unit according to this embodiment, the counter output shaft 12 is both-side-supported by both side portions thereof, by the drive unit case 9. Accordingly, inclination due to the reaction force in meshing the counter driven gear 52 with the counter drive gear 51 integrated with the counter output shaft 12 is inhibited. Therefore, oscillated rotation of the counter output shaft 12 is prevented, thereby meshing misalignment of the gears 51 and 52 due to the oscillated rotation is eliminated, and thus gear noise occurrence is prevented. Additionally, the input shaft 11 is also supported by the drive unit case 9 through the counter output shaft 12 in which oscillated rotation has been inhibited, and therefore oscillated rotation of the input shaft 11 is also prevented. Consequently, the planetary gear set 6 which is connected thereto is also prevented from engaging in a misalignment manner. Furthermore, the input shaft 11 is supported by the same counter output shaft 12, thereby the supporting accuracy of the input shaft 11 on the drive unit case 9 is improved. In addition, both side-supporting portions of the input shaft 11 is placed at the same position, in the axial direction, as the both-side-supporting portions of the counter output shaft 12. Therefore, the supporting accuracy of the input shaft 11 is not influenced by the flexure of the counter output shaft 12.

Further, the supporting load on the counter output shaft 12 can be distributed to the case body 90 and to the front cover 92 thereof, and thus the load applied to the case body 90, for which it is difficult to keep the rigidity strength due to the formation of the window hole for connecting the cables 20, 40, can be reduced compared with a conventional structure in which the case body 90 provides a one-side supporting. Furthermore, combined with the distribution of the supporting load, the radial ball bearings 56, 57 are provided as the supporting mechanism. Accordingly, work hours for assembling the counter output shaft can be reduced because the necessity for fastening adjustment of the bearing is eliminated, and the cost and size of the bearing can be reduced.

Furthermore, the outer diameter of the input shaft 11 is automatically determined by an amount of an input torque while the counter output shaft 12 and the counter drive gear 51 are integrated and thus the outer diameter of the counter drive gear 51 can be decreased while the torque transmission strength is maintained. Therefore, the counter gear ratio can be given more freely. Furthermore, the supporting accuracy of the counter drive gear 51 equals the supporting accuracy of the counter output shaft 12, and thus the supporting accuracy of the input shaft 11 which is supported by the counter output shaft 12 is improved, and a meshing accuracy of the planetary gear set 6 is also improved.

Additionally, the drive mechanism of the oil pump P can be arranged closer to the generator 4 than the both of the supporting portions of the counter output shaft 12, with the planetary gear set 6 interposed. Therefore, the oil pump P also can be disposed on the electric motor housing portion side of the drive unit case 9. Therefore, the oil passage can be arranged using the case wall which surrounds the electric motor housing portion.

In the invention, in accordance with an embodiment thereof, it is possible for the supporting accuracy of the input shaft to be unaffected by a flexure of the counter output shaft.

According to another embodiment of the invention, the input shaft is both side-supported by the same counter output shaft, and thus the supporting accuracy of the input shaft on the drive unit case is improved. Furthermore, the both side-supporting portion of the input shaft is placed at the same position as the both side-supporting portion of the counter output shaft, in the axial direction. Accordingly, the supporting accuracy of the input shaft is not influenced by the flexure of the counter output shaft.

According to another embodiment of the invention, a supporting load on the counter output shaft can be distributed to the case body and the front cover thereof. Accordingly, compared with a conventional structure in which one side-supporting on the case body is made, it is possible to reduce the load on the case body for which the rigidity strength is difficult to be maintained because a window hole for cable connection is formed. In addition to the distribution of the supporting load, if the radial ball bearing is provided as a supporting mechanism, it is possible to decrease work hours for assembling the counter output shaft because the bearing fastening adjustment is not necessary, and downsizing of the bearing and cost reduction are possible.

According to another embodiment of the invention, the outer diameter of the input shaft is automatically determined by an amount of an input torque while the counter output shaft and the counter drive gear are integrated and thus the outer diameter of the counter drive gear can be decreased while the torque transmission strength is maintained. Therefore, the counter gear ratio can be given more freely. Therefore, the supporting accuracy of the input shaft supported on the counter output shaft is improved, and the meshing accuracy of the planetary gear set is also improved.

According to another embodiment of the invention, with the planetary gear set interposed, a drive mechanism of the oil pump can be arranged closer to the electric motor than the both side-supporting portion of the counter output shaft, and thus the oil pump also can be disposed on the electric motor housing portion side of the drive unit case. Therefore, an oil passage can be arranged using a case wall which surrounds an electric motor housing portion.

According to another embodiment of the invention, each effect mentioned above can be achieved for a hybrid drive unit in which two electric motors are arranged.

The invention was described hereinabove in detail, according to the embodiment in which the invention is adopted solely for a hybrid drive unit. However, the invention is not limited to this embodiment, but instead, may be carried out by variously modifying within the scope of the invention.

The invention claimed is:

1. A drive unit equipped with an electric motor, comprising:
    an input shaft that is connected to an engine;
    an electric motor shaft that serves as an output shaft of an electric motor;
    a counter output shaft; and
    a planetary gear set for drive-connecting the input shaft, the electric motor shaft and the counter output shaft so as to enable mutual transmission of power in which the input shaft is arranged in a coaxial relationship in an inner circumference of the counter output shaft,
    wherein the input shaft and the counter output shaft are connected respectively, on one side of the planetary gear set, to two other elements which are different from an element with which the electric motor shaft is connected,
    an outer circumference of both edge portions of the counter output shaft is supported by a drive unit case, and
    an outer circumference of the input shaft is supported by an inner circumference of the counter output shaft; by the drive unit case through the counter output shaft.

2. The drive unit equipped with the electric motor according to claim 1, wherein a supporting portion of the input shaft is placed at a same position as a supporting portion of the counter output shaft, in an axial direction.

3. The drive unit equipped with the electric motor according to claim 1, wherein both sides of the input shaft are supported by the counter output shaft, on an inner circumferential side of a supporting portion to the drive unit case of the counter output shaft.

4. The drive unit equipped with the electric motor according to claim 1, wherein a case body and a front cover of the case body support the counter output shaft to the drive unit case, through radial ball bearings.

5. The drive unit equipped with the electric motor according to claim 1, wherein the counter output shaft has a counter drive gear which is integrated therewith.

6. The drive unit equipped with the electric motor according to claim 1, wherein the planetary gear set is provided such that the element which is connected to the input shaft is drive-connected to an oil pump, on another side of the planetary gear set.

7. The drive unit equipped with the electric motor according to claim 1, wherein the counter output shaft is connected to a wheel through a gear train, and a second electric motor is connected to the gear train.

8. A drive unit equipped with an electric motor, comprising:
an input shaft that is connected to an engine;
an electric motor shaft that serves as an output shaft of an electric motor;
a counter output shaft;
a planetary gear set for drive-connecting the input shaft, the electric motor shaft and the counter output shaft so as to enable mutual transmission of power in which the input shaft is arranged in a coaxial relationship in an inner circumference of the counter output shaft; and
a case body, wherein an outer circumference of both edge portions of the counter output shaft is supported by a front cover and an intermediate wall of the case body and an outer circumference of the input shaft is supported by an inner circumference of the counter output shaft by the case body through the counter output shaft.

9. The drive unit equipped with the electric motor according to claim 8, wherein a supporting portion of the input shaft is placed at a same position as a supporting portion of the counter output shaft, in an axial direction.

10. The drive unit equipped with the electric motor according to claim 8, wherein both sides of the input shaft are supported by the counter output shaft, on an inner circumferential side of a supporting portion to the case body of the counter output shaft.

11. The drive unit equipped with the electric motor according to claim 8, wherein the counter output shaft has a counter drive gear which is integrated therewith.

12. The drive unit equipped with the electric motor according to claim 8, wherein the planetary gear set is provided such that the element which is connected to the input shaft is drive-connected to an oil pump, on another side of the planetary gear set.

13. The drive unit equipped with the electric motor according to claim 8, wherein the counter output shaft is connected to a wheel through a gear train, and a second electric motor is connected to the gear train.

* * * * *